United States Patent
Racke et al.

(10) Patent No.: US 12,473,509 B2
(45) Date of Patent: Nov. 18, 2025

(54) LIQUID COOLANTS WITH DISSOLVED GAS FOR ELECTRIC SYSTEMS

(71) Applicant: ExxonMobil Technology and Engineering Company, Annandale, NJ (US)

(72) Inventors: David A. Racke, West Deptford, NJ (US); Andrew D. Satterfield, Furlong, PA (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 213 days.

(21) Appl. No.: 17/998,126

(22) PCT Filed: Apr. 1, 2021

(86) PCT No.: PCT/US2021/025293
§ 371 (c)(1),
(2) Date: Nov. 7, 2022

(87) PCT Pub. No.: WO2021/242404
PCT Pub. Date: Dec. 2, 2021

(65) Prior Publication Data
US 2023/0203397 A1    Jun. 29, 2023

Related U.S. Application Data

(60) Provisional application No. 63/030,498, filed on May 27, 2020.

(51) Int. Cl.
*C10M 169/04* (2006.01)
*C10M 105/06* (2006.01)
(Continued)

(52) U.S. Cl.
CPC ........ *C10M 169/04* (2013.01); *C10M 105/06* (2013.01); *C10M 107/02* (2013.01);
(Continued)

(58) Field of Classification Search
CPC .............. C10M 169/04; C10M 105/06; C10M 107/02; C10M 125/00; C10M 177/00;
(Continued)

(56) References Cited

U.S. PATENT DOCUMENTS

| 2014/0042841 A1 | 2/2014 | Rippel et al. |
| 2015/0059880 A1 | 3/2015 | Inoue |
| 2017/0058737 A1 | 3/2017 | Mittricker et al. |

FOREIGN PATENT DOCUMENTS

| CN | 101341235 A | * | 1/2009 | ........ C10M 171/008 |
| CN | 101568625 A | * | 10/2009 | .......... C10M 105/38 |

(Continued)

OTHER PUBLICATIONS

Written Opinion and International Search Report from corresponding PCT Application No. PCT/US2021/025293 mailed Jul. 5, 2021.

*Primary Examiner* — Taiwo Oladapo
(74) *Attorney, Agent, or Firm* — Vorys, Sater, Seymour and Pease LLP

(57) ABSTRACT

Disclosed are liquid coolants for electric systems and methods of making the same. An example liquid coolant for electric systems may comprise: a base oil, wherein the base oil is a major component of the liquid coolant; and a dissolved gas in an amount sufficient to have a measurable effect on fluid viscosity of the liquid coolant; wherein the liquid coolant has a kinematic viscosity at 100° C. of about 7 cSt or less.

23 Claims, 1 Drawing Sheet

(51) Int. Cl.
    *C10M 107/02*     (2006.01)
    *C10M 125/00*     (2006.01)
    *C10M 177/00*     (2006.01)
    *H02K 9/19*     (2006.01)
    *C10N 30/02*     (2006.01)
    *C10N 40/00*     (2006.01)
    *C10N 70/00*     (2006.01)

(52) U.S. Cl.
    CPC ........ C10M 125/00 (2013.01); C10M 177/00 (2013.01); H02K 9/19 (2013.01); *C10M 2201/04* (2013.01); *C10M 2201/16* (2013.01); *C10M 2203/1065* (2013.01); *C10M 2205/0206* (2013.01); *C10N 2030/02* (2013.01); *C10N 2040/40* (2020.05); *C10N 2070/00* (2013.01)

(58) Field of Classification Search
    CPC .......... C10M 2201/04; C10M 2201/16; C10M 2203/1065; C10M 2205/0206; C10M 2205/0285; C10M 171/02; H02K 9/19; H02K 9/20; H02K 2213/03; C10N 2030/02; C10N 2040/40; C10N 2070/00; C10N 2040/14; C10N 2040/30

See application file for complete search history.

(56) References Cited

FOREIGN PATENT DOCUMENTS

| | | | |
|---|---|---|---|
| CN | 106459776 A | 2/2017 | |
| WO | WO-0140397 A2 * | 6/2001 | ............. C09K 5/045 |
| WO | WO-2019146395 A1 * | 8/2019 | ............. C09K 5/04 |
| WO | 2021/242404 A1 | 12/2021 | |

* cited by examiner

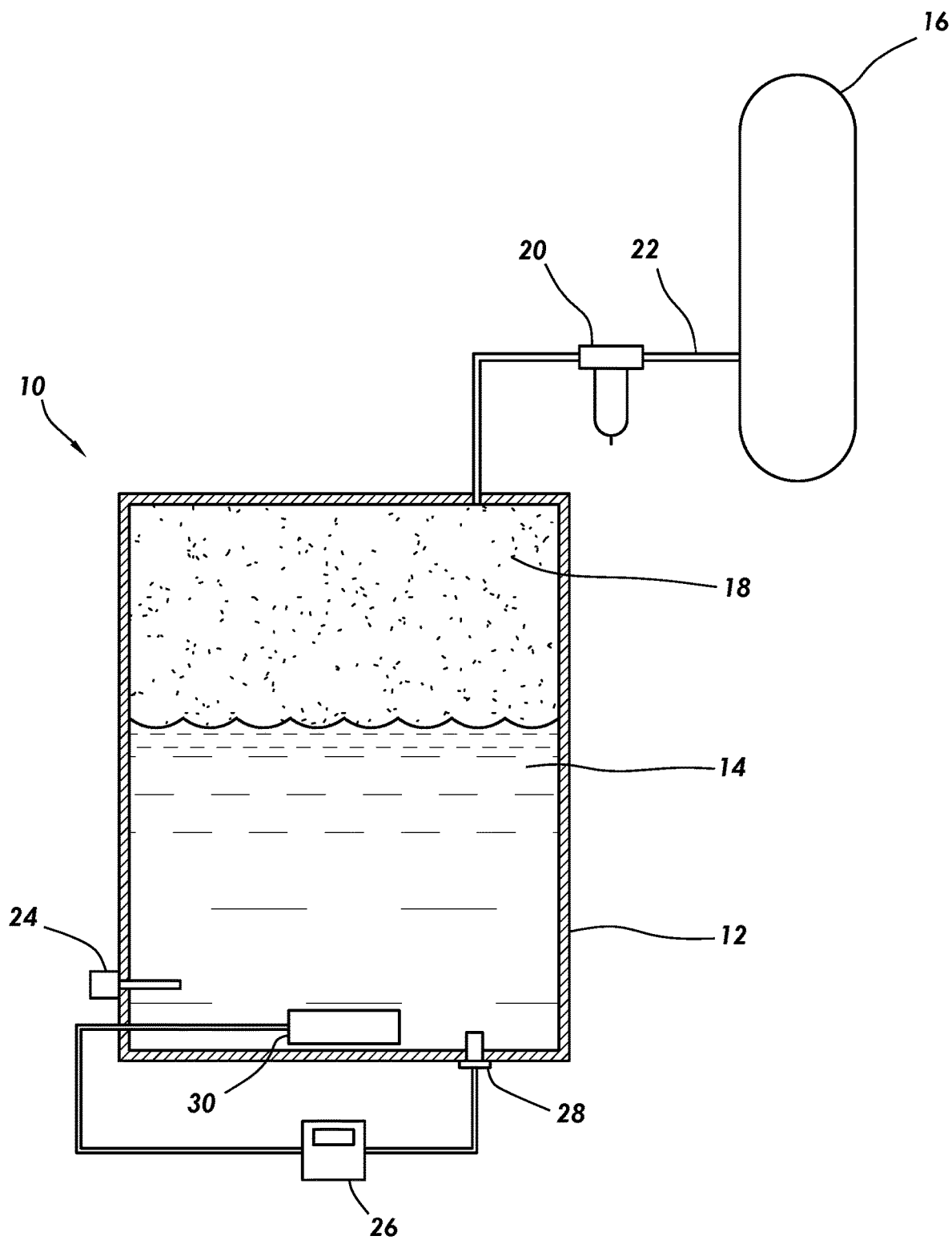

LIQUID COOLANTS WITH DISSOLVED GAS FOR ELECTRIC SYSTEMS

FIELD OF THE INVENTION

The present disclosure relates to liquid coolants for electric systems and methods of making the same. Such liquid coolants may contain a dissolved gas for reduction of viscosity to provide improved cooling.

BACKGROUND

Heat transfer systems are incorporated into many types of electric systems to help remove generated heat and thereby regulate prolonged operation of the electric systems. Various electric systems often include an electric motor, which can require an efficient heat transfer system to remove heat generated through operation. Cooling of electric motors can be achieved by circulation of a specially designed fluid, referred herein as a "liquid coolant." The effectiveness of liquid coolants can be dependent on viscosity, along with other properties such as thermal conductivity. Cooling effectiveness, as well as energy efficiency for fluid pumping, can be improved with the use of low viscosity coolants. However, very low viscosity coolants can be problematic. For example, liquid coolants designed with a very low viscosity can have increased volatility and flammability, as well as inhalation hazards. A coolant with a kinematic viscosity at 100° C. of less than 4 centistokes ("cSt") and a kinematic viscosity at 40° C. of less than 18 cSt, as measured in accordance with ASTM D445, may be considered to have a "very low viscosity."

There remains a need for a liquid coolant that effectively improves fuel economy while also providing desirable levels of volatility and flammability.

SUMMARY

Disclosed herein is an example liquid coolant for electric systems, comprising: a base oil, wherein the base oil is a major component of the liquid coolant; and a dissolved gas in an amount sufficient to have a measurable effect on fluid viscosity of the liquid coolant; wherein the liquid coolant has a kinematic viscosity at 100° C. of about 7 cSt or less.

Further disclosed herein is an example method of producing a liquid coolant, comprising introducing a base oil into a container; and pressuring the container with a gas such that a volume of the gas dissolves into the base oil to provide the liquid coolant; wherein the liquid coolant has a kinematic viscosity at 100° C. of about 7 cSt or less.

Further disclosed herein is an example method of cooling an electric system, comprising: circulating a liquid coolant into a contact with one or more components of the electric system, wherein the liquid coolant comprises: a base oil, wherein the base oil is a major component of the liquid coolant; and a dissolved gas, wherein the dissolved gas is present in the liquid coolant in an amount sufficient to have a measurable effect on fluid viscosity of the liquid coolant; wherein the liquid coolant has a kinematic viscosity at 100° C. of about 7 cSt or less.

BRIEF DESCRIPTION OF THE DRAWINGS

The drawings illustrate certain aspects of the present disclosure and should not be used to limit or define the disclosure.

FIG. 1 is a schematic illustration of an example system for introduction of a dissolved gas into a base oil.

DETAILED DESCRIPTION

The following is a detailed description of the disclosure provided to aid those skilled in the art in practicing the present disclosure. Those of ordinary skill in the art may make modifications and variations in the embodiments described herein without departing from the spirit or scope of the present disclosure. Unless otherwise defined, all technical and scientific terms used herein have the same meaning as commonly understood by one of ordinary skill in the art to which this disclosure belongs. The terminology used in the description of the disclosure herein is for describing particular embodiments only and is not intended to be limiting of the disclosure. All publications, patent applications, patents, figures and other references mentioned herein are expressly incorporated by reference in their entirety.

The phrases "electric system," "electric device," "electrical system, "electrical device," and any variant thereof, refers to any system, device, or apparatus primarily powered or operated through electrical means and requiring a heat transfer system to remove generated heat for prolonged operation. Example electric systems include, but are not limited to, an electric vehicle, power electronics included in an electric vehicle (e.g., "on-board" electronics), an electric motor, a battery, a rechargeable battery system, a charging station, electronic equipment, a computer, a server bank (or farm), a data center, or any combination thereof.

"Electric vehicle," and any variant thereof, refers to all-electric and fully electric vehicles, and hybrid and hybrid electric vehicles, which may have any of a variety of parallel or series drivetrain configurations, alone or in combination, and includes the mechanical and electrical systems, subsystems, and components having gears used in the vehicles. These mechanical and electrical systems, subsystems and components having gears can include, for example, electrical vehicle powertrains, powertrain components, drivetrain components, kinetic energy recovery systems (KERS), energy regenerative systems, and the like. The terms electric vehicle and hybrid vehicle may be used interchangeably. Moreover, the term "electric vehicle" is not limited to land-bound vehicles (e.g., automobiles), but is also intended to encompass any type of vehicle that is fully or partially powered electrically and includes aviation vehicles (e.g., airplanes, drones, spacecraft, etc.) and nautical vehicles (e.g., any type of water craft, hovercraft, etc.). "Electric vehicle" can also refer to manually driven or autonomous vehicles, or any hybrid thereof.

The present disclosure relates to liquid coolants for electric systems and methods of making the same. In accordance with present embodiments, the liquid coolants may include a base oil and a dissolved gas. Example embodiments of the liquid coolants may also include additional additives, such as antioxidants. In this disclosure, the term liquid coolant encompasses lubricating oils, lubricating fluids, lubricants, lubricant oils, working fluids, cooling fluids, and cooling oils; such terms may be used interchangeably.

By inclusion of the dissolved gas in the base oil, the resultant liquid coolant has a reduced viscosity. This reduction in viscosity should provide the liquid coolant with improved cooling power. In addition, unlike reduction of viscosity by other means, introduction of the dissolved gas into the base oil should not cause an increase in volatility or flammability. Because the decrease in viscosity was not achieved by a change in the molecular structure of the base oil, but rather by inclusion of the dissolved gas, the volatility and flammability of the liquid coolant should not be impacted.

The viscosity of the liquid coolant may be adjusted by selection of the base oil and the amount and type of dissolved gas. In some embodiments, the liquid coolant may have a relatively low kinematic viscosity at 100° C. ("KV100") and at 40° C. ("KV40"). As used herein, the terms "kinematic viscosity at 100° C." or "KV100" of a liquid coolant refers to the kinematic viscosity at 100° C. as measured in accordance with ASTM D445. In some embodiments, the liquid coolant may have a KV100 of about 7 centistokes (cSt) or less, or about 6 cSt or less, or about 5 cSt or less, or about 4 cSt or less, or about 3 cSt or less, or about 1 cSt or less. In some embodiments, the liquid coolant may have a KV100 of about 1 cSt to about 5 cSt, or about 2 cSt to about 5 cSt, or about 2 cSt to about 4 cSt. In some embodiments, the liquid coolant may also have a minimum KV100. For example, liquid coolant may have a KV100 of about 0.5 or greater, about 0.6 or greater, about 0.7 or greater, about 0.8 or greater, about 0.9 or greater, or about 1.0 or greater. In some embodiments, the liquid coolant may have a KV100 in range of about 0.5 cSt to about 7 cSt, or about 0.5 cSt to about 6 cSt, or about 0.5 cSt to about 5 cSt, or about 1 cSt to about 7 cSt, or about 1 cSt to about 6 cSt, or about 1 cSt to about 5 cSt.

As used herein, the terms "kinematic viscosity at 4° C." or "KV40" of a liquid coolant refers to the kinematic viscosity at 100° C. as measured in accordance with ASTM D445. In some embodiments, the liquid coolant may have a KV40 of about 30 centistokes (cSt) or less, or about 28 cSt or less, or about 26 cSt or less, or about 24 cSt or less. In some embodiments, the liquid coolant may have a KV40 of about 15 cSt to about 30 cSt, or about 20 cSt to about 30 cSt, or about 20 cSt to about 28 cSt. In some embodiments, the liquid coolant may be considered to have a "very low viscosity" in that embodiments of the liquid coolant may have KV100 of about 4 cSt or less and a KV40 of about 28 cSt or less.

The liquid coolant with the dissolved gas may have desirable volatility. One measure of volatility may be flash point. As used herein, the flash point is determined in accordance with ASTM D92 open cup flash point. In some embodiments, the liquid coolant may have a flash point of about 90° C. to about 275° and, alternatively, a flash point of about 150° C. to about 250° C.

The cooling power of the liquid coolant may be improved by the reduction in viscosity from the dissolved gas. The cooling power depends on a variety factors and can be quantified by a number of different tests. One example is the heat transfer coefficient, which is equal to heat flux dived by temperature difference as shown by the following equation:

$$h = \frac{q}{\Delta T} \quad (1)$$

wherein h is the heat transfer coefficient, q is the heat flux, and $\Delta T$ is the difference between the temperature of the surrounding fluid and the solid surface. The heat transfer coefficient can be used for calculating heat transfer between a fluid and a solid. There are various formulations for calculating the heat transfer coefficient for various heat transfer modes. The Dittus-Bolter correlation can be used in many applications and is provided below:

$$\frac{hd}{k} = 0.023 \frac{jd^{0.8}}{\mu} \frac{\mu c_p^n}{k} \quad (2)$$

wherein h is the heat transfer coefficient, d is hydraulic diameter, k is thermal conductivity of the bulk fluid, j is the mass flux, $\mu$ is the fluid viscosity, $c_p$ is isobaric heat capacity of the fluid, and n is 0.33 for the applications with the liquid coolant being cooler than the wall.

The density of the liquid coolant is a fluid property for imparting satisfactory heat transfer performance in electric systems. As used herein, the density is determined in accordance with ASTM D4052. In some embodiments, at a temperature of 40° C., the liquid coolant may have a density of about 0.25 g/mL to about 1.75 g/mL, or from about 0.30 g/mL to about 1.70 g/mL, or about 0.35 g/mL to about 1.65 g/mL, or about 0.40 g/mL to about 1.60 g/mL, or about 0.45 g/mL to about 1.55 g/mL. In another embodiment, at a temperature of 80° C., the liquid coolants may have a density of about 0.25 g/mL to about 1.75 g/mL, or about 0.30 g/mL to about 1.70 g/mL, or about 0.35 g/mL to about 1.65 g/mL, or about 0.40 g/mL to about 1.60 g/mL, or about 0.45 g/mL to about 1.55 g/mL.

The specific heat of the liquid coolant is another fluid property for imparting satisfactory heat transfer performance in electric systems. As used herein, the specific heat is determined in accordance with ASTM E1269. In some embodiments, at a temperature of 40° C., the liquid coolants may have a specific heat of about 1.25 kJ/kg·K to about 3.50 kJ/kg·K, or about 1.35 kJ/kg·K to about 3.40 kJ/kg·K, or about 1.45 kJ/kg·K to about 3.25 kJ/kg·K, or about 1.50 kJ/kg·K to about 3.20 kJ/kg·K, or about 1.55 kJ/kg·K to about 3.15 kJ/kg·K. In another embodiment, at a temperature of 80° C., the liquid coolants may have a specific heat of about 1.25 kJ/kg·K to about 3.50 kJ/kg·K, or about 1.35 kJ/kg·K to about 3.40 kJ/kg·K, or about 1.45 kJ/kg·K to about 3.25 kJ/kg·K, or about 1.50 kJ/kg·K to about 3.20 kJ/kg·K, or about 1.55 kJ/kg·K to about 3.15 kJ/kg·K.

The dynamic viscosity of the liquid coolant is another fluid property for imparting satisfactory heat transfer performance in electric systems. As used herein, the dynamic viscosity is determined in accordance with ASTM E1269. In some embodiments, where the average fluid temperature is 40° C., the liquid coolants may have a dynamic viscosity about 0.50 centipoise (cP) to about 7.50 cP, or about 0.55 cP to about 7.00 cP, or about 0.65 cP to about 6.50 cP, or about 0.70 cP to about 6.00 cP, or about 0.75 cP to about 5.50 cP. In another embodiment, where the average fluid temperature is 80° C., the liquid coolants may have a dynamic viscosity about 0.50 cP to about 7.50 cP, or about 0.55 cP to about 7.00 cP, or about 0.65 cP to about 6.50 cP, or about 0.70 cP to about 6.00 cP, or about 0.75 cP to about 5.50 cP.

The liquid coolants mentioned herein provide sustained liquid coolant properties over the lifetime of the liquid coolant, and compatibility with the electrical systems mentioned herein, e.g., an electric vehicle and its components and materials. Illustrative electric system and electric vehicle components that can be cooled in accordance with this disclosure include, for example, electric vehicle batteries, electric motors, electric generators, AC-DC/DC-AC/AC-AC/DC-DC converters, AC-DC/DC-AC/AC-AC/DC-DC transformers, power management systems, electronics controlling batteries, on-board chargers, on-board power electronics, super-fast charging systems, fast charging equipment at charging stations, stationary super-fast chargers, and the like.

Depending on the particular electric system (e.g., electric vehicle batteries, electric motors, electric generators, AC-DC/DC-AC/AC-AC/DC-DC converters, AC-DC/DC-AC/AC-AC/DC-DC transformers, power management systems, electronics controlling batteries, on-board chargers, on-board power electronics, super-fast charging systems, fast charging equipment at charging stations, stationary super-fast chargers, and the like), the electric system can operate over a wide temperature range. For example, the electric system can operate at a temperature between about −40° C. and about 175° C., or between about −25° C. and about 170° C., or between about −10° C. and about 165° C., or between about 0° C. and about 160° C., or between about 10° C. and about 155° C., or between about 25° C. and about 150° C., or between about 25° C. and about 125° C., or between about 30° C. and about 120° C., or between about 35° C. and about 115° C., or between about 35° C. and about 105° C., or between about 35° C. and about 95° C., or between about 35° C. and about 85° C.

In an embodiment, a single liquid coolant can be used in the electric system. In another embodiment, more than one liquid coolant can be used in the electric system, for example, one liquid coolant for the battery and another liquid coolant for another component of the electric system.

The liquid coolants mentioned herein provide cooling on surfaces of apparatus components that include, for example, the following: metals, metal alloys, non-metals, non-metal alloys, mixed carbon-metal composites and alloys, mixed carbon-nonmetal composites and alloys, ferrous metals, ferrous composites and alloys, non-ferrous metals, non-ferrous composites and alloys, titanium, titanium composites and alloys, aluminum, aluminum composites and alloys, magnesium, magnesium composites and alloys, ion-implanted metals and alloys, plasma modified surfaces; surface modified materials; coatings; mono-layer, multi-layer, and gradient layered coatings; honed surfaces; polished surfaces; etched surfaces; textured surfaces; micro and nano structures on textured surfaces; super-finished surfaces; diamond-like carbon (DLC), DLC with high-hydrogen content, DLC with moderate hydrogen content, DLC with low-hydrogen content, DLC with near-zero hydrogen content, DLC composites, DLC-metal compositions and composites, DLC-non-metal compositions and composites; ceramics, ceramic oxides, ceramic nitrides, FeN, CrN, ceramic carbides, mixed ceramic compositions, and the like; polymers, thermoplastic polymers, engineered polymers, polymer blends, polymer alloys, polymer composites; materials compositions and composites, that include, for example, graphite, carbon, molybdenum, molybdenum disulfide, polytetrafluoroethylene, polyperfluoropropylene, polyperfluoroalkylethers, and the like.

As previously described, the liquid coolant may be used for cooling of electric systems in accordance with present embodiments. The liquid coolants disclosed herein provide may provide sustained liquid coolant properties over the lifetime of the liquid coolant, and compatibility with the electrical systems mentioned herein, e.g., an electric motor, electric vehicle, and their corresponding components and materials. Illustrative electric system components that can be cooled in accordance with this disclosure include, for example, electric batteries, electric motors, electric generators, AC-DC/DC-AC/AC-AC/DC-DC converters, AC-DC/DC-AC/AC-AC/DC-DC transformers, power management systems, electronics controlling batteries, on-board chargers, on-board power electronics, super-fast charging systems, fast charging equipment at charging stations, stationary super-fast chargers, and the like.

Depending on the particular electric system (e.g., electric batteries, electric motors, electric generators, AC-DC/DC-AC/AC-AC/DC-DC converters, AC-DC/DC-AC/AC-AC/DC-DC transformers, power management systems, electronics controlling batteries, on-board chargers, on-board power electronics, super-fast charging systems, fast charging equipment at charging stations, stationary super-fast chargers, and the like), the electric system can operate over a wide temperature range. For example, the electric system can operate at a temperature between about −40° C. and about 175° C., or between about −25° C. and about 170° C., or between about −10° C. and about 165° C., or between about 0° C. and about 160° C., or between about 10° C. and about 155° C., or between about 25° C. and about 150° C., or between about 25° C. and about 125° C., or between about 30° C. and about 120° C., or between about 35° C. and about 115° C., or between about 35° C. and about 105° C., or between about 35° C. and about 95° C., or between about 35° C. and about 85° C.

In an embodiment, a single liquid coolant can be used in the electric system. In another embodiment, more than one heat liquid coolant can be used in the electric system, for example, one heat transfer fluid for the battery and another heat transfer fluid for another component of the electric system.

The liquid coolants mentioned herein may be used on surfaces of apparatus components that include, for example, the following: metals, metal alloys, non-metals, non-metal alloys, mixed carbon-metal composites and alloys, mixed carbon-nonmetal composites and alloys, ferrous metals, ferrous composites and alloys, non-ferrous metals, non-ferrous composites and alloys, titanium, titanium composites and alloys, aluminum, aluminum composites and alloys, magnesium, magnesium composites and alloys, ion-implanted metals and alloys, plasma modified surfaces; surface modified materials; coatings; mono-layer, multi-layer, and gradient layered coatings; honed surfaces; polished surfaces; etched surfaces; textured surfaces; micro and nano structures on textured surfaces; super-finished surfaces; diamond-like carbon (DLC), DLC with high-hydrogen content, DLC with moderate hydrogen content, DLC with low-hydrogen content, DLC with near-zero hydrogen content, DLC composites, DLC-metal compositions and composites, DLC-non-metal compositions and composites; ceramics, ceramic oxides, ceramic nitrides, FeN, CrN, ceramic carbides, mixed ceramic compositions, and the like; polymers, thermoplastic polymers, engineered polymers, polymer blends, polymer alloys, polymer composites; materials compositions and composites, that include, for example, graphite, carbon, molybdenum, molybdenum disulfide, polytetrafluoroethylene, polyperfluoropropylene, polyperfluoroalkylethers, and the like.

In some embodiments, the electric systems may include an oil cooling system. An example of an oil cooling system may include one or more conduits and a pump configured to circulate the liquid coolant through the one or more conduits. The pump may comprise, for example, a positive displacement pump or a centrifugal pump. The liquid coolant may comprise any of the liquid coolants disclosed herein and may be used to cool an electric system component (e.g., electric motor, electric battery) that forms part of an electric system. In some embodiments, the liquid coolant may be configured to directly cool one or more surfaces of the electric system component to thereby draw heat away from the electric system component. After exchanging heat with the electric system component, the warmed liquid coolant is conveyed away from the electric system component 108 at an elevated temperature. The warmed liquid coolant is then conveyed within the conduit(s) to a heat exchanger included in the oil cooling system. The heat exchanger may operate similar to a radiator by drawing heat away from the warmed liquid coolant. In some embodiments, the heat exchanger may reject heat to another fluid or to air at ambient temperature, for example. The heat exchanger may be a specific device, or, simply heat lost to the atmosphere as the heat transfer fluid flows through the conduit(s). The liquid coolant may then be recirculated to the electric system component. These descriptions of the electric coolant system are merely examples and that the liquid coolant can be used with any suitable electric cooling system for cooling of electric system components.

One or more embodiments of an oil cooling system may include circulation of the liquid coolant into contact with the one or more components of the electric system, such as an electric batter or electric motor. The liquid coolant may absorb heat from the electric system component to thereby cool the electric system component by heat removal. Suitable oil cooling systems may include surface cooling and/or internal cooling of the electric motor. One or more embodiments of an oil cooling system that uses surface cooling may circulate the liquid coolant through a cooling jacket on the outside of the motor stator. One or more embodiments of an oil cooling system that uses internal cooling may circulate the liquid coolant through the electric system component. By circulation through the electric system component, such as an electric motor, the liquid coolant may function to lubricate the electric system component (e.g., motor bearings) in addition to cooling. In some embodiments, surface and internal cooling techniques can be combined. However, it should be understood that these descriptions of cooling techniques are merely examples and that the liquid coolant can be used in accordance with other techniques for cooling of an electric motor.

Base Oils

Examples embodiments of the liquid coolants may include one or more base oils. Suitable base oils may include natural oils, mineral oils and synthetic oils, and unconventional oils (or mixtures thereof) can be used unrefined, refined, or rerefined (the latter is also known as reclaimed or reprocessed oil). Unrefined oils are those obtained directly from a natural or synthetic source and used without added purification. These include shale oil obtained directly from retorting operations, petroleum oil obtained directly from primary distillation, and ester oil obtained directly from an esterification process. Refined oils are similar to the oils discussed for unrefined oils except refined oils are subjected to one or more purification steps to improve at least one liquid coolant base oil property. One skilled in the art is familiar with many purification processes. These processes include solvent extraction, secondary distillation, acid extraction, base extraction, filtration, and percolation. Rerefined oils are obtained by processes analogous to refined oils but using an oil that has been previously used as a feedstock.

Groups I, II, III, IV and V are broad base oil stock categories developed and defined by the American Petroleum Institute (API Publication 1509) to create guidelines for liquid coolant base oils. Group I base stocks have a viscosity index of between about 80 to 120 and contain greater than about 0.03% sulfur and/or less than about 90% saturates. Group II base stocks have a viscosity index of between about 80 to 120 and contain less than or equal to about 0.03% sulfur and greater than or equal to about 90% saturates. Group III stocks have a viscosity index greater than about 120 and contain less than or equal to about 0.03% sulfur and greater than about 90% saturates. Group IV includes polyalphaolefins (PAO). Group V base stock includes base stocks not included in Groups I-IV. The table below summarizes properties of each of these five groups.

TABLE 1

| | Base Oil Properties | | |
|---|---|---|---|
| | Saturates | Sulfur | Viscosity Index |
| Group I | <90 and/or | >0.03% and | ≥80 and <120 |
| Group II | ≥90 and | ≤0.03% and | ≥80 and <120 |
| Group III | ≥90 and | ≤0.03% and | ≥120 |
| Group IV | polyalphaolefins (PAO) | | |
| Group V | All other base oil stocks not included in Groups I, II, III or IV | | |

Natural oils include animal oils, vegetable oils (castor oil and lard oil, for example), and mineral oils. Animal and vegetable oils possessing favorable thermal oxidative stability can be used. Mineral oils vary widely as to their crude source, for example, as to whether they are paraffinic, naphthenic, or mixed paraffinic-naphthenic. Oils derived from coal or shale are also useful. Natural oils vary also as to the method used for their production and purification, for example, their distillation range and whether they are straight run or cracked, hydrorefined, or solvent extracted.

Group II and/or Group III hydroprocessed or hydrocracked base stocks, including synthetic oils such as alkyl aromatics and synthetic esters are also well-known base stock oils.

Synthetic oils include hydrocarbon oil. Hydrocarbon oils include oils such as polymerized and interpolymerized olefins (polybutylenes, polypropylenes, propylene isobutylene copolymers, ethylene-olefin copolymers, and ethylene-alphaolefin copolymers, for example). Polyalphaolefin (PAO) oil base stocks are commonly used synthetic hydrocarbon oil. By way of example, PAOs derived from $C_8$, $C_{10}$, $C_{12}$, $C_{14}$ olefins or mixtures thereof may be utilized.

The number average molecular weights of the PAOs, which are known materials and generally available on a major commercial scale from suppliers such as ExxonMobil Chemical Company, Chevron Phillips Chemical Company, BP, and others, typically vary from about 250 to about 3,000, although PAO's may be made in viscosities up to about 350 cSt (100° C.). The PAOs are typically comprised of relatively low molecular weight hydrogenated polymers or oligomers of alphaolefins which include, but are not limited to, $C_2$ to about $C_{32}$ alphaolefins with the $C_8$ to about $C_{16}$ alphaolefins, such as 1-octene, 1-decene, 1-dodecene and the like. Examples of suitable polyalphaolefins are poly-1-octene, poly-1-decene and poly-1-dodecene and mixtures thereof and mixed olefin-derived polyolefins. However, the dimers of higher olefins in the range of $C_{14}$ to $C_{18}$ may be used to provide low viscosity base stocks of acceptably low volatility. Depending on the viscosity grade and the starting oligomer, the PAOs may be predominantly trimers and tetramers of the starting olefins, with minor amounts of the higher oligomers, having a viscosity range of 1.5 cSt to 12 cSt. PAO fluids of particular use may include 3.0 cSt, 3.4 cSt, and/or 3.6 cSt and combinations thereof. Mixtures of PAO fluids having a viscosity range of 1.5 cSt to approximately 350 cSt or more may be used if desired.

The PAO fluids may be conveniently made by the polymerization of an alphaolefin in the presence of a polymerization catalyst such as the Friedel-Crafts catalysts including, for example, aluminum trichloride, boron trifluoride or complexes of boron trifluoride with water, alcohols such as ethanol, propanol or butanol, carboxylic acids or esters such as ethyl acetate or ethyl propionate.

Other useful liquid coolant oil base stocks include wax isomerate base stocks and base oils, comprising hydroisomerized waxy stocks (e.g. waxy stocks such as gas oils, slack waxes, fuels hydrocracker bottoms, etc.), hydroisomerized Fischer-Tropsch waxes, Gas-to-Liquids (GTL) base stocks and base oils, and other wax isomerate hydroisomerized base stocks and base oils, or mixtures thereof. Fischer-Tropsch waxes, the high boiling point residues of Fischer-Tropsch synthesis, are highly paraffinic hydrocarbons with very low sulfur content. The hydroprocessing used for production of such base stocks may use an amorphous hydrocracking/hydroisomerization catalyst, such as one of the specialized lube hydrocracking (LHDC) catalysts or a crystalline hydrocracking/hydroisomerization catalyst, such as a zeolitic catalyst. For example, one useful catalyst is ZSM-48.

Gas-to-Liquids (GTL) base oils, Fischer-Tropsch wax derived base oils, and other wax-derived hydroisomerized (wax isomerate) base oils be advantageously used in the instant disclosure, and may have useful KV100's of about 3 cSt to about 50 cSt, alternatively about 3 cSt to about 30 cSt, and alternatively about 3.5 cSt to about 25 cSt, as exemplified by GTL 4 with KV100 of about 4.0 cSt and a viscosity index of about 141. These Gas-to-Liquids (GTL) base oils, Fischer-Tropsch wax derived base oils, and other wax-derived hydroisomerized base oils may have useful pour points of about –20° C. or lower, and under some conditions may have advantageous por points of about –25° C. or lower, with useful pour points of about –30° C. to about –40° C. or lower. Useful compositions of Gas-to-Liquids (GTL) base oils, Fischer-Tropsch wax derived base oils, and wax-derived hydroisomerized base oils are recited in The hydrocarbyl aromatics can be used as a base oil or base oil component and can be any hydrocarbyl molecule that contains at least about 5% of its weight derived from an aromatic moiety such as a benzenoid moiety or naphthenoid moiety, or their derivatives. These hydrocarbyl aromatics include alkyl benzenes, alkyl naphthalenes, alkyl diphenyl oxides, alkyl naphthols, alkyl diphenyl sulfides, alkylated bis-phenol A, alkylated thiodiphenol, and the like. The aromatic can be mono-alkylated, dialkylated, polyalkylated, and the like. The aromatic can be mono- or poly-functionalized. The hydrocarbyl groups can also be comprised of mixtures of alkyl groups, alkenyl groups, alkynyl, cycloalkyl groups, cycloalkenyl groups and other related hydrocarbyl groups. The hydrocarbyl groups can range from about $C_6$ up to about $C_{60}$ such as a range of about $C_8$ to about $C_{20}$. A mixture of hydrocarbyl groups may also be used, and up to about three such substituents may be present. The hydrocarbyl group can optionally contain sulfur, oxygen, and/or nitrogen containing substituents. The aromatic group can also be derived from natural (petroleum) sources, provided at least about 5% of the molecule is comprised of an above-type aromatic moiety. Viscosities at 100° C. of approximately 3 cSt to about 50 cSt may be used, with viscosities of approximately 3.4 cSt to about 20 cSt often being used for the hydrocarbyl aromatic component. In one embodiment, an alkyl naphthalene where the alkyl group is primarily comprised of 1-hexadecene is used. Other alkylates of aromatics can be advantageously used. Naphthalene or methyl naphthalene, for example, can be alkylated with olefins such as octene, decene, dodecene, tetradecene or higher, mixtures of similar olefins, and the like. Useful concentrations of hydrocarbyl aromatic in a liquid coolant can be about 2% to about 25%, alternatively about 4% to about 20%, and alternatively about 4% to about 15%, depending on the application.

Alkylated aromatics such as the hydrocarbyl aromatics of the present disclosure may be produced by well-known Friedel-Crafts alkylation of aromatic compounds. For example, an aromatic compound, such as benzene or naphthalene, is alkylated by an olefin, alkyl halide or alcohol in the presence of a Friedel-Crafts catalyst. Many homogeneous or heterogeneous, solid catalysts are known to one skilled in the art. The choice of catalyst depends on the reactivity of the starting materials and product quality requirements. For example, strong acids such as $AlCl_3$, $BF_3$, or HF may be used. In some cases, milder catalysts such as $FeCl_3$ or $SnCl_4$ may be used. Newer alkylation technology uses zeolites or solid super acids.

Esters comprise a useful base stock. Additive solvency and seal compatibility characteristics may be secured by the use of esters such as the esters of dibasic acids with monoalkanols and the polyol esters of monocarboxylic acids. Esters of the former type include, for example, the esters of dicarboxylic acids such as phthalic acid, succinic acid, alkyl succinic acid, alkenyl succinic acid, maleic acid, azelaic acid, suberic acid, sebacic acid, fumaric acid, adipic acid, linoleic acid dimer, malonic acid, alkyl malonic acid, alkenyl malonic acid, etc., with a variety of alcohols such as butyl alcohol, hexyl alcohol, dodecyl alcohol, 2-ethylhexyl alcohol, etc. Specific examples of these types of esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, etc.

Particularly useful synthetic esters are those which are obtained by reacting one or more polyhydric alcohols, such as the hindered polyols (such as the neopentyl polyols, e.g., neopentyl glycol, trimethylol ethane, 2-methyl-2-propyl-1, 3-propanediol, trimethylol propane, pentaerythritol and dipentaerythritol) with alkanoic acids containing at least about 4 carbon atoms, e.g., $C_5$ to $C_{30}$ acids such as saturated straight chain fatty acids including caprylic acid, capric acid, lauric acid, myristic acid, palmitic acid, stearic acid, arachic acid, and behenic acid, or the corresponding branched chain fatty acids or unsaturated fatty acids such as oleic acid, or mixtures of any of these materials.

Suitable synthetic ester components include the esters of trimethylol propane, trimethylol butane, trimethylol ethane, pentaerythritol and/or dipentaerythritol with one or more monocarboxylic acids containing from about 5 carbon atoms to about 10 carbon atoms. These esters are widely available commercially, for example, the Mobil P-41 and P-51 esters of ExxonMobil Chemical Company.

Also useful are esters derived from renewable material such as coconut, palm, rapeseed, soy, sunflower and the like. These esters may be monoesters, di-esters, polyol esters, complex esters, or mixtures thereof. These esters are widely available commercially, for example, the Mobil P-51 ester of ExxonMobil Chemical Company.

Liquid coolant formulations containing renewable esters are included in this disclosure. For such formulations, the renewable content of the ester is typically greater than about 70 wt. %, alternatively more than about 80 wt. % and alternatively more than about 90 wt. %.

Other useful fluids include non-conventional or unconventional base stocks that have been processed, e.g., catalytically, or synthesized to provide high performance heat transfer characteristics.

Non-conventional or unconventional base stocks/base oils include one or more of a mixture of base stock(s) derived from one or more Gas-to-Liquids (GTL) materials, as well as isomerate/isodewaxate base stock(s) derived from natural wax or waxy feeds, mineral and or non-mineral oil waxy feed stocks such as slack waxes, natural waxes, and waxy stocks such as gas oils, waxy fuels hydrocracker bottoms, waxy raffinate, hydrocrackate, thermal crackates, or other mineral, mineral oil, or even non-petroleum oil derived waxy materials such as waxy materials received from coal liquefaction or shale oil, and mixtures of such base stocks.

GTL materials are materials that are derived via one or more synthesis, combination, transformation, rearrangement, and/or degradation/deconstructive processes from gaseous carbon-containing compounds, hydrogen-containing compounds and/or elements as feedstocks such as hydrogen, carbon dioxide, carbon monoxide, water, methane, ethane, ethylene, acetylene, propane, propylene, propyne, butane, butylenes, and butynes. GTL base stocks and/or base oils are GTL materials that are generally derived from hydrocarbons; for example, waxy synthesized hydrocarbons, that are themselves derived from simpler gaseous carbon-containing compounds, hydrogen-containing compounds and/or elements as feedstocks. GTL base stock(s) and/or base oil(s) include oils boiling in the lube oil boiling range (1) separated/fractionated from synthesized GTL materials such as, for example, by distillation and subsequently subjected to a final wax processing step which involves either or both of a catalytic dewaxing process, or a solvent dewaxing process, to produce lube oils of reduced/low pour point; (2) synthesized wax isomerates, comprising, for example, hydrodewaxed or hydroisomerized cat and/or solvent dewaxed synthesized wax or waxy hydrocarbons; (3) hydrodewaxed or hydroisomerized cat and/or solvent dewaxed Fischer-Tropsch (F-T) material (i.e., hydrocarbons, waxy hydrocarbons, waxes and possible analogous oxygenates); such as hydrodewaxed or hydroisomerized/followed by cat and/or solvent dewaxing dewaxed F-T waxy hydrocarbons, or hydrodewaxed or hydroisomerized/followed by cat (or solvent) dewaxing dewaxed, F-T waxes, or mixtures thereof.

GTL base stock(s) and/or base oil(s) derived from GTL materials, especially, hydrodewaxed or hydroisomerized/followed by cat and/or solvent dewaxed wax or waxy feed, such as F-T material derived base stock(s) and/or base oil(s), are characterized typically as having KV100's of from about 2 cSt to about 50 cSt. They are further characterized typically as having pour points of −5° C. to about −40° C. or lower (ASTM D97). They are also characterized typically as having viscosity indices of about 80 to about 140 or greater (ASTM D2270).

In addition, the GTL base stock(s) and/or base oil(s) are typically highly paraffinic (>90% saturates) and may contain mixtures of monocycloparaffins and multicycloparaffins in combination with non-cyclic isoparaffins. The ratio of the naphthenic (i.e., cycloparaffin) content in such combinations varies with the catalyst and temperature used. Further, GTL base stock(s) and/or base oil(s) typically have very low sulfur and nitrogen content, generally containing less than about 10 ppm, and more typically less than about 5 ppm of each of these elements. The sulfur and nitrogen content of GTL base stock(s) and/or base oil(s) obtained from F-T material, especially F-T wax, is essentially nil. In addition, the absence of phosphorous and aromatics make this materially especially suitable for the formulation of low SAP products.

The term GTL base stock and/or base oil and/or wax isomerate base stock and/or base oil is to be understood as embracing individual fractions of such materials of wide viscosity range as recovered in the production process, mixtures of two or more of such fractions, as well as mixtures of one or two or more low viscosity fractions with one, two or more higher viscosity fractions to produce a blend wherein the blend exhibits a target kinematic viscosity.

The GTL material, from which the GTL base stock(s) and/or base oil(s) is/are derived may be F-T material (i.e., hydrocarbons, waxy hydrocarbons, wax).

As noted above, Group V base stocks may include base stocks not included in Groups I-IV. Examples of suitable Group V base stocks may include, but are not limited to: hydrocarbyl aromatics and alkylated aromatics such as alkyl naphthalenes; esters including mono and polyesters; silicate esters; polyalkylene glycols including oil-soluble polyalkylene glycols; polytetrahydrofurans; and ionic liquids.

Base oils for use in the formulated liquid coolants useful in the present disclosure are any of the variety of oils corresponding to API Group I, Group II, Group III, Group IV, and Group V oils, and mixtures thereof, alternatively API Group II, Group III, Group IV, and Group V oils, and mixtures thereof, and alternatively Group III, Group IV, and Group V base oils, and mixtures thereof. Highly paraffinic base oils can be used to advantage in the formulated liquid coolants useful in the present disclosure. Minor quantities of Group I stock, such as the amount used to dilute additives for blending into formulated lube oil products, can also be used. Even in regard to the Group II stocks, the Group II stock may be in the higher quality range associated with that stock, i.e. a Group II stock having a viscosity index in the range 100<VI<120.

Examples of suitable base fluids for use in the formulated liquid coolants useful in the present disclosure include, for example, aromatic hydrocarbons, polyolefins, paraffins, isoparaffins, esters, ethers, fluorinated fluids, nano fluids, and silicone oils.

The base oil may typically constitute the major component of the liquid coolant of the present disclosure and typically may be present in an amount ranging from about 50 wt. % to about 99 wt. %, for example, from about 70 wt. % to about 90 wt. % or from about 85 wt. % to about 95 wt. %, based on the total weight of the liquid coolant. The base oil may be selected from any of the synthetic or natural oils typically used as crankcase lubricating oils for spark-ignited and compression-ignited engines. The base oil may have a KV100 of 2.5 cSt to 12 cSt and alternatively of 2.5 cSt to 9 cSt. Mixtures of synthetic and natural base oils may be used if desired. Bi-modal mixtures of Group I, II, III, IV, and/or V base stocks are also used if desired.

Dissolved Gas

Examples embodiments of the liquid coolants may include a dissolved gas. As previously described, by inclusion of the dissolved gas, the viscosity of the liquid coolant can be reduced, resulting in improved cooling. However, even though the liquid coolant has a viscosity reduction from the dissolved gas, there should be no undesirable increase in volatility and/or flammability that are typically associated with a viscosity reduction.

The dissolved gas may include any of a variety of gases soluble in the base oil. Suitable gases may include inert gases, including, but not limited to, carbon dioxide, nitrogen, and noble gases, such as argon, helium, neon, krypton, and xenon. While helium and neon may be used as they are non-reactive, they may be difficult to dissolve in the base oil, thus potentially resulting in lesser impact on viscosity as compared to other inert gases, such as carbon dioxide, argon, and krypton. Additional gases may also be suitable. For example, Examples of suitable additional gases may include, but are not limited to, air, oxygen, hydrogen, nitrogen, ammonia, carbon monoxide, and hydrocarbons, such as methane, ethane, ethylene, acetylene, propane, propylene, and butane. While additional, non-reactive gases such as air and nitrogen may be used in the liquid coolants, they may less effective at dissolving in the base oil than some of the inert gases. Additional gases that are more reactive, such as oxygen, hydrogen, ammonia, and carbon monoxide may also be used but are only moderately effective at dissolving the base oil. While combustible hydrocarbons, such as methane, ethane, ethylene, propylene, and acetylene may be used and can be very effective at reducing viscosity, precautions should be taken as the combustible nature of these hydrocarbons can cause safety hazards.

The concentration of gas dissolved in the liquid coolant is a function of the gas's solubility in the base oil, as well as pressure and temperature, among other factors. For example, temperature is a factor that impacts gas solubility with gas solubility decreasing as temperature increases. In addition, pressure is another factor that impacts gas solubility with gas solubility increasing as the pressure of the gas increases. The gas may be included in liquid coolant in an amount sufficient to have a measurable effect on fluid viscosity. As used herein, a measurable effect on viscosity refers to a decrease in viscosity of at least 2%, compared to the repeatability of a standard viscosity measurement of about 1% (ASTM D445). The exact decrease in viscosity depends on a number of factors. For example, 0.6 grams per liter (g/L) of argon dissolved in a PAO base oil having a KV100 of about 2 cSt was shown to decrease viscosity by at least 2% while 0.2 g/L of argon dissolved in a PAO base oil having a KV100 of about 4 cSt was shown to decrease viscosity by at least 2%. Carbon dioxide was also shown to have a strong effect on viscosity. Therefore, some embodiments may include dissolved gas in the liquid coolant in an amount of about 0.2 g/L or more. For example, the dissolved gas may be included in an amount of about 0.25 g/L or more, about 0.3 g/L or more, about 0.35 g/L or more, about 0.4 g/L or more, about 0.45 g/L or more, or about 0.5 g/L or more. The maximum amount of the dissolved gas in the liquid coolant may vary based on a number of factors, including, but not limited to, the particular gas and base oil, as well as temperature and pressure. For example, the dissolved gas may be included in an amount up to about 380 g/L, which is approximately the concentration of carbon dioxide in a PAO base oil having a KV100 of about 4 cSt when exposed to a carbon dioxide atmosphere at 15000 psi (103000 kPa) and 20° C. By way of further example, the dissolved gas may be included in an amount up to about 19.5, which is approximately the concentration of carbon dioxide in this PAO when exposed to a carbon dioxide atmosphere at 1160 psi (8000 kPa) and 60° C. In some embodiments, the amount of the dissolved gas in the liquid coolant may range from about 0.2 g/L to about 400 g/L. For example, the amount of dissolved gas may range from about 0.2 g/L to about 200 g/L, about 0.2 g/L to about 100 g/L, about 0.2 g/L to about 40 g/L, about 0.2 g/L to about 20 g/L, about 0.2 g/L to about 10 g/L, about 0.2 g/L to about 5 g/L, about 0.2 g/L to about 1 g/L, about 0.3 g/L to about 400 g/L, 0.3 g/L to about 200 g/L, about 0.3 g/L to about 100 g/L, about 0.3 g/L to about 40 g/L, about 0.3 g/L to about 20 g/L, about 0.3 g/L to about 10 g/L, about 0.3 g/L to about 5 g/L, about 0.3 g/L to about 1 g/L, 0.4 g/L to about 400 g/L, 0.4 g/L to about 200 g/L, about 0.4 g/L to about 100 g/L, about 0.4 g/L to about 40 g/L, about 0.4 g/L to about 20 g/L, about 0.4 g/L to about 10 g/L, about 0.4 g/L to about 5 g/L, or about 0.4 g/L to about 1 g/L.

In accordance with present embodiments, the concentration of the dissolved gas in the liquid coolant may exceed the equilibrium volume of the gas in the liquid coolant at standard ambient temperature and pressure in an air atmosphere. As used herein, standard ambient temperature and pressure (SATP) refers to 25° C. and 100 kPa. In some embodiments, the concentration of the dissolved gas in the liquid coolant may exceed the equilibrium volume at SATP in an air atmosphere by about 10% or more, about 20% or more, about 30% or more, about 50% or more, about 100% or more, about 200% or more, or about 500% or more.

Any suitable technique may be used for dissolution of the gas in the base oil of the liquid coolant. Dissolution of the gas may include placement of the liquid coolant including the base oil into an atmosphere of the gas. By selection of the gas volume, gas pressure, and temperature of the liquid coolant, the volume of gas dissolved into the liquid coolant may be controlled. Viscosity of the liquid coolant may be monitored to determine the volume of the dissolved gas as the viscosity is dependent on the concentration of the dissolved gas. Increasing pressure should result in increased dissolution and lower viscosity. After dissolution, the liquid coolant may be stored in a pressure pressurized container for a period of time, for example, about 1 day or longer, or about 2 days or longer, or about 1 week or longer.

FIG. 1 illustrates an example gas dissolution system 10. As illustrated, the gas dissolution system 10 may include a container 12, a liquid coolant 14, and a gas source 16. Gas from the gas source 16 may be supplied to the container 12 and dissolved into the liquid coolant 14 to thereby reduce its viscosity and improve its cooling power.

In the illustrated embodiment, the liquid coolant 14 is disposed in the container 12. The liquid coolant 14 may include any of the previously described base oils suitable for use in a liquid coolant. The gas source 16 may be used to supply the gas to the container 12 such that the container 12 has a gas atmosphere 18. The container 12 is referred to as having the gas atmosphere 18 as the gas from the gas source 16 surrounds the liquid coolant 14 in the container 12. The gas atmosphere 18 may be include about 90% or more, about 95% or more, about 96% or more, about 97% or more, about 98% or more, about 99% or more, or about 99.9% or more by volume of the gas. The gas may be any of the previously described gases for dissolution in the base oil of the liquid coolant 14. The gas source 16 may include, for example, a pressure vessel or other suitable vessel for storage of the gas above atmospheric pressure.

The gas dissolution system 10 may further include a pressure regulator 20. The pressure regulator 20 may be positioned, for example, in a flow path 22 between the gas source 16 and the container 12. The pressure regulator 20 may be used for control of the gas pressure in the container 12. While not shown separately, the pressure regulator 20 may include, for example, a pressure sensor, a controller, and/or a flow valve.

The gas dissolution system 10 may further include a viscometer 24. The viscometer 24 may be used for measurement of the viscosity of the liquid coolant 14. In some embodiments, the viscosity of the liquid coolant 14 can be monitored with the viscometer 14. As previously described, the gas in the gas atmosphere 18 should dissolve into the liquid coolant 14. The pressure of the gas atmosphere 18 and temperature of the liquid coolant 14 may controlled to control gas dissolution and, thus, viscosity of the liquid coolant 14.

The gas dissolution system 10 may further include a temperature controller 26 for monitoring a temperature of the liquid coolant 14. The temperature controller 26 may receive a temperature measurement of the liquid coolant 14 from a temperature sensor 28, such as a thermocouple. A set temperature value may be input and/or otherwise stored in the temperature controller 26. The temperature controller 26 may compare the temperature measurement to the set temperature value to determine how much heating and/or cooling may be needed. In response to this comparison, the temperature controller 26 may produce an output signal to a heat adjustment device 30. As illustrated, the heat adjustment device 30 may be in contact with the liquid coolant 14. Based on the output signal, the heat adjustment device 30 may heat and/or cool the liquid coolant 14. The heat adjustment device 30 may include a heater, a cooler, or a combination thereof.

In operation, the gas dissolution system 10 may be used to dissolve gas into the liquid coolant 14. The liquid coolant 14 including a base oil may be introduced into the container 12. Gas from the gas source 16 may be used to provide the gas atmosphere 18 in the container 12. In the container, the gas from the gas atmosphere 18 should dissolve into the liquid coolant 14. The pressure of the gas atmosphere in the container 12 may be controlled. For example, the pressure regulator 20 or other suitable device may be used to control pressure of the gas atmosphere 18. For example, a set pressure value may be input into or otherwise stored in the pressure regulator 20. The pressure regulator 20 may be used to control the flow of the gas into the container 12 to provide the set pressure value in the container 12 of the gas atmosphere 18. The temperature of the liquid coolant 14 be controlled, for example, with the temperature controller 26.

Liquid Coolant Additives

The formulated liquid coolant useful in the present disclosure may additionally contain one or more commonly used liquid coolant performance additives including but not limited to antioxidants, corrosion inhibitors, antifoam agents, antiwear additives, antistatic additives, pour point depressants, nanomaterials, nanoparticles, dispersants, detergents, viscosity modifiers, metal passivators, ionic liquids, extreme pressure additives, anti-seizure agents, wax modifiers, fluid-loss additives, seal compatibility agents, lubricity agents, friction modifiers, anti-staining agents, chromophoric agents, demulsifiers, emulsifiers, densifiers, wetting agents, gelling agents, tackiness agents, colorants, and others. When liquid coolants contain one or more of the additives discussed above, the additive(s) are blended into the composition in an amount sufficient for it to perform its intended function. These additives may be used with varying amounts of diluent oil, that may range from 5 wt. % to 50 wt. %. The additives useful in this disclosure do not have to be soluble in the liquid coolants. The types and quantities of performance additives used in combination with the instant disclosure in liquid coolants are not limited by the examples shown herein as illustrations.

Accordingly, the preceding description describes liquid coolants and methods of making the same that may contain a dissolved gas for reduction of viscosity to provide improved cooling. The foregoing liquid coolants and corresponding methods of making can further include any one or more of the following embodiments:

Embodiment 1. A liquid coolant for electric systems, comprising: a base oil, wherein the base oil is a major component of the liquid coolant; and a dissolved gas in an amount sufficient to have a measurable effect on fluid viscosity of the liquid coolant; wherein the liquid coolant has a kinematic viscosity at 100° C. of about 7 cSt or less.

Embodiment 2. The liquid coolant of claim 1, wherein the base oil comprises at least one base stock selected from the group consisting of Group I base stock, Group II base stock, Group III base stock, Group IV base stock, Group V base stock, and combinations thereof.

Embodiment 3. The liquid coolant of claim 1 or claim 2, wherein the base oil comprises a polyalphaolefin base stock.

Embodiment 4. The liquid coolant of claim 1 or claim 2, wherein the base oil comprises at least one Group V base stock selected from the group consisting of hydrocarbyl aromatics, alkylated aromatics, monoesters, polyesters, silicate esters, polyalkylene glycols, polytetrahydrofurans, and ionic liquids, and combinations thereof.

Embodiment 5. The liquid coolant of any one of embodiments 1-4, wherein the dissolved gas comprises an inert gas in an amount of about 0.2 grams or more per Liter of the liquid coolant.

Embodiment 6. The liquid coolant of any one of embodiments 1-4, wherein the dissolved gas comprises carbon dioxide in an amount of about 0.2 grams or more per Liter of the liquid coolant.

Embodiment 7. The liquid coolant of any one of embodiments 1-4, wherein the dissolved gas comprises a noble gas in an amount of about 0.2 grams or more per Liter of the liquid coolant.

Embodiment 8. The liquid coolant of any one of embodiments 1-4, wherein the dissolved gas comprises argon in an amount of about 0.2 grams or more per Liter of the liquid coolant.

Embodiment 9. The liquid coolant of coolant of any one of embodiments 1-4, wherein the dissolved gas comprises a hydrocarbon in an amount about 0.2 grams or more per Liter of the liquid coolant.

Embodiment 10. The liquid coolant of any one of embodiments 1-9, wherein the dissolved gas is present in an amount of about 0.2 grams per Liter to about 400 grams per Liter of the liquid coolant.

Embodiment 11. The liquid coolant of any one of embodiments 1-10, wherein the dissolved gas is present in an amount of about 0.5 grams per Liter to about 200 grams per Liter of the liquid coolant.

Embodiment 12. The liquid coolant of any one of embodiments 1-11, wherein the kinematic viscosity at 100° C. of the liquid coolant is about 1 cSt to about 4 cSt, wherein a heat capacity of the liquid coolant is about 2.0 kJ/kg K or greater, wherein a density of the liquid coolant is about 0.92 g/mL or greater.

Embodiment 13. The liquid coolant of embodiment 12, wherein the base oil comprises a polyalphaolefin base stock, wherein the dissolved gas comprises carbon dioxide in an amount of about 0.2 grams per Liter or more of the liquid coolant.

Embodiment 14. A method of producing a liquid coolant, comprising: introducing a base oil into a container; and pressuring the container with a gas such that a volume of the gas dissolves into the base oil to provide the liquid coolant; wherein the liquid coolant has a kinematic viscosity at 100° C. of about 7 cSt or less.

Embodiment 15. The method of claim 14, wherein the gas comprises a noble gas dissolved in the liquid coolant in an amount of about 0.2 grams or more per Liter.

Embodiment 16. The method of claim 14, wherein the gas comprise a carbon dioxide dissolved in the liquid coolant in an amount of about 0.2 grams or more per Liter.

Embodiment 17. The method of any one of embodiments 14-16, wherein a gas atmosphere in the container comprises about 90% or more of the gas by volume of the gas atmosphere.

Embodiment 18. The method of claim any one of embodiments 14-17, further comprising monitoring a viscosity of the base oil in the container with a viscometer.

Embodiment 19. The method of embodiment 18, further comprising adjusting a pressure in the container in response to the viscosity.

Embodiment 20. The method of any one of embodiments 14-19, further comprising monitoring a temperature of the base oil in the container.

Embodiment 21. The method of any one of embodiments 14-20, further comprising storing the liquid coolant for about 1 day or more in a sealed container with an atmosphere of the gas in the sealed container, wherein the sealed container is the container or a different container.

Embodiment 22. A method of cooling an electric system, comprising: circulating a liquid coolant into a contact with one or more components of the electric system, wherein the liquid coolant comprises: a base oil, wherein the base oil is a major component of the liquid coolant; and a dissolved gas, wherein the dissolved gas is present in the liquid coolant in an amount sufficient to have a measurable effect on fluid viscosity of the liquid coolant; wherein the liquid coolant has a kinematic viscosity at 100° C. of about 7 cSt or less.

Embodiment 23. The method of claim 22, wherein the circulating comprises circulating the liquid coolant through an electric motor.

Embodiment 24. The method of claim 22, wherein the gas comprises carbon dioxide in an amount of about 0.2 grams or more per Liter of the liquid coolant.

EXAMPLES

To facilitate a better understanding of the present disclosure, the following examples of certain aspects of some embodiments are given. In no way should the following examples be read to limit, or define, the entire scope of the disclosure.

Example 1

This example was performed to illustrate the dissolution of a gas into a base oil. The base oil used for this example was a PAO4 base oil with a density of about 0.82 g/cm$^3$ at 15° C., a KV100 of about 4 cSt, and a KV40 of about 18.4 cSt. The PAO4 base oil also had a flash point of about 218° C., and a liquid solubility parameter of 15.3 MPa$^{0.5}$. The gas was carbon dioxide with a gas solubility parameter of 14.81 MPa$^{0.5}$.

The example was performed using a test system that measures properties of the sample liquid coolant. The test system allowed continuous circulation of the liquid coolant as well as providing agitation to achieve vapor-liquid equilibrium. The PAO base oil was first gravimetrically charged into a bulk fluid reservoir and cooled to approximately 10 Kelvin below room temperature at which time the gas was then gravimetrically charged from a small stainless steel cell into the bulk fluid reservoir to achieve the desired bulk composition in the system. Once the system was charged, a gear pump was activated to circulate the liquid coolant through each measurement stage. In a bulk fluid reservoir, the bulk mixture pressure was measured with a calibrated pressure transducer. The liquid density was measured at the first measurement stage with a massflow meter. The massflow meter measured the liquid density, circulating liquid temperature, and circulating liquid massflow rate. The liquid viscosity was measured at a second measurement stage with two high-pressure viscometers with overlapping ranges. The entire flow loop was installed inside a temperature chamber to keep temperature variations in the different components below 3 K.

Experimental measurements of liquid density, vapor pressure, and viscosity were recorded over a temperature range of −20° C. to 150° C. The experiment was repeated over this temperature range at pressures ranging from 0 bar to 100 bar. From these experimental measurements, the viscosity decrease and gas content of the liquid coolant were calculated. The viscosity decreased was calculate compared to the comparative sample at 0 bar with no gas dissolution. The results of this tests are provided in the table below:

TABLE 2

| Measured Temp. (° C.) | Measured Pressure (bar) | Modeled Gas Content (g/L) | Calculated Viscosity Decrease (%) | Measured, Interpolated Liquid Coolant Viscosity (cSt) |
|---|---|---|---|---|
| −20 | 0 | 0.00 | 0.0% | 483.3 |
| 0 | 0 | 0.00 | 0.0% | 113.6 |
| 20 | 0 | 0.00 | 0.0% | 40.2 |
| 40 | 0 | 0.00 | 0.0% | 18.7 |
| 60 | 0 | 0.00 | 0.0% | 10.6 |
| 100 | 0 | 0.00 | 0.0% | 4.87 |
| 150 | 0 | 0.00 | 0.0% | 2.77 |
| 0 | 20 | 9.61 | 72.9% | 30.7 |
| 20 | 20 | 7.47 | 54.3% | 18.4 |
| 40 | 20 | 5.97 | 40.6% | 11.1 |
| 60 | 20 | 4.89 | 30.7% | 7.32 |
| 100 | 20 | 3.46 | 18.2% | 3.98 |
| 150 | 20 | 2.42 | 10.0% | 2.49 |
| 20 | 40 | 14.94 | 77.2% | 9.15 |
| 40 | 40 | 11.95 | 61.4% | 7.23 |
| 60 | 40 | 9.77 | 48.3% | 5.46 |
| 100 | 40 | 6.91 | 30.3% | 3.40 |
| 150 | 40 | 4.85 | 17.5% | 2.28 |
| 40 | 60 | 17.92 | 72.6% | 5.12 |
| 60 | 60 | 14.66 | 59.2% | 4.31 |
| 100 | 60 | 10.37 | 38.9% | 2.98 |
| 150 | 60 | 7.27 | 23.5% | 2.12 |
| 60 | 80 | 19.54 | 66.4% | 3.55 |
| 100 | 80 | 13.82 | 45.1% | 2.67 |
| 150 | 80 | 9.69 | 28.2% | 1.99 |
| 100 | 100 | 17.28 | 49.7% | 2.45 |
| 150 | 100 | 12.11 | 31.9% | 1.89 |

As illustrated in Table 2 above, the viscosity of the liquid coolant decreased with increasing concentration of dissolved carbon dioxide. For example, the liquid coolant had a viscosity of 4.87 cSt at atmospheric pressure and 100° C. with no dissolved carbon dioxide but had a viscosity of 2.45 cSt at 100 bar and 100° C. with 12 g/L of dissolved carbon dioxide, indicating a viscosity reduction of 49.7%.

Example 2

This example was performed to further illustrate the dissolution of a gas into a base oil. The base oil used for this example was a PAO4 base oil with a density of about 0.82 g/cm$^3$ at 15° C., a KV100 of about 4 cSt, and a KV40 of about 18.4 cSt. The PAO4 base oil also had a flash point of about 218° C., and a liquid solubility parameter of 15.3 MPa$^{0.5}$. The gas was Argon with a gas solubility parameter of 7.77 MPa$^{0.5}$.

The test system described in Example 1 was used for this example. Experimental measurements of liquid density, vapor pressure, and viscosity were recorded over a temperature range of −20° C. to 150° C. The experiment was repeated over this temperature range at pressures ranging from 0 bar to 125 bar. From these experimental measurements, the viscosity decrease and gas content of the liquid coolant were calculated. The viscosity decreased was calculate compared to the comparative sample at 0 bar with no gas dissolution. The results of this tests are provided in the table below:

TABLE 3

| Measured Temp. (° C.) | Measured Pressure (bar) | Modeled Gas Content (g/L) | Calculated Viscosity Decrease (%) | Measured, Interpolated Liquid Coolant Viscosity (cSt) |
|---|---|---|---|---|
| −20 | 0 | 0.00 | 0.0% | 472.4 |
| 0 | 0 | 0.00 | 0.0% | 114.0 |
| 20 | 0 | 0.00 | 0.0% | 40.9 |
| 40 | 0 | 0.00 | 0.0% | 19.2 |
| 60 | 0 | 0.00 | 0.0% | 10.9 |
| 80 | 0 | 0.00 | 0.0% | 7.04 |
| 100 | 0 | 0.00 | 0.0% | 5.02 |
| 150 | 0 | 0.00 | 0.0% | 2.84 |
| 0 | 20 | 1.02 | 18.2% | 93.2 |
| 20 | 20 | 0.93 | 14.6% | 34.9 |
| 40 | 20 | 0.85 | 11.9% | 16.9 |
| 60 | 20 | 0.78 | 9.9% | 9.80 |
| 80 | 20 | 0.72 | 8.3% | 6.46 |
| 100 | 20 | 0.67 | 7.0% | 4.67 |
| 150 | 20 | 0.57 | 4.8% | 2.71 |
| 20 | 40 | 1.85 | 23.2% | 31.40 |
| 40 | 40 | 1.69 | 19.1% | 15.52 |
| 60 | 40 | 1.56 | 16.0% | 9.13 |
| 80 | 40 | 1.44 | 13.5% | 6.09 |
| 100 | 40 | 1.34 | 11.5% | 4.44 |
| 150 | 40 | 1.14 | 8.1% | 2.61 |
| 40 | 60 | 2.54 | 25.3% | 14.34 |
| 60 | 60 | 2.33 | 21.2% | 8.56 |
| 80 | 60 | 2.16 | 18.0% | 5.77 |
| 100 | 60 | 2.01 | 15.5% | 4.24 |
| 150 | 60 | 1.71 | 10.9% | 2.53 |
| 60 | 80 | 3.11 | 25.8% | 8.07 |
| 80 | 80 | 2.88 | 22.0% | 5.49 |
| 100 | 80 | 2.68 | 18.9% | 4.07 |
| 150 | 80 | 2.28 | 13.4% | 2.46 |
| 60 | 100 | 3.89 | 29.6% | 7.66 |
| 80 | 100 | 3.60 | 25.3% | 5.25 |
| 100 | 100 | 3.35 | 21.9% | 3.92 |
| 150 | 100 | 2.85 | 15.6% | 2.40 |
| 80 | 125 | 4.50 | 28.6% | 5.03 |
| 100 | 125 | 4.18 | 24.8% | 3.77 |
| 150 | 125 | 3.56 | 17.8% | 2.34 |

As illustrated in Table 3 above, the viscosity of the liquid coolant decreased with increasing concentration of dissolved Argon. For example, the liquid coolant had a viscosity of 5.02 cSt at atmospheric pressure and 100° C. with no dissolved Argon but had a viscosity of 3.35 cSt at 100 bar and 100° C. with 3.35 g/L of dissolved Argon, indicating a viscosity reduction of 21.9%.

Example 3

This example was performed to further illustrate the dissolution of a gas into a base oil. The base oil used for this example was a PAO2 base oil with a density of about 0.80 g/cm³ at 15° C., a KV100 of about 1.7 cSt, and a KV40 of about 5.1 cSt. The PAO2 base oil also had a flash point of about 162° C., and a liquid solubility parameter of 15.5 MPa$^{0.5}$. The gas was Argon with a gas solubility parameter of 7.77 MPa$^{0.5}$.

The test system described in Example 1 was used for this example. Experimental measurements of liquid density,
vapor pressure, and viscosity were recorded over a temperature range of −20° C. to 150° C. The experiment was repeated over this temperature range at pressures ranging from 0 bar to 125 bar. From these experimental measurements, the viscosity decrease and gas content of the liquid coolant were calculated. The viscosity decreased was calculate compared to the comparative sample at 0 bar with no gas dissolution. The results of this tests are provided in the table below:

TABLE 4

| Measured Temperature (° C.) | Measured Pressure (bar) | Modeled Gas Content (g/L) | Calculated Liquid Coolant Viscosity Decrease (%) | Measured, Interpolated Viscosity (cSt) |
|---|---|---|---|---|
| −20 | 0 | 0.00 | 0.0% | 50.4 |
| 0 | 0 | 0.00 | 0.0% | 18.6 |
| 20 | 0 | 0.00 | 0.0% | 9.2 |
| 40 | 0 | 0.00 | 0.0% | 5.6 |
| 60 | 0 | 0.00 | 0.0% | 3.9 |
| 80 | 0 | 0.00 | 0.0% | 2.94 |
| 100 | 0 | 0.00 | 0.0% | 2.39 |
| 150 | 0 | 0.00 | 0.0% | 1.71 |
| 0 | 20 | 0.96 | 6.3% | 17.4 |
| 20 | 20 | 0.88 | 4.4% | 8.8 |
| 40 | 20 | 0.81 | 3.3% | 5.4 |
| 60 | 20 | 0.75 | 2.6% | 3.77 |
| 80 | 20 | 0.70 | 2.2% | 2.88 |
| 100 | 20 | 0.65 | 1.8% | 2.35 |
| 150 | 20 | 0.56 | 1.2% | 1.69 |
| 20 | 40 | 1.76 | 12.6% | 8.05 |
| 40 | 40 | 1.62 | 9.2% | 5.07 |
| 60 | 40 | 1.50 | 7.0% | 3.60 |
| 80 | 40 | 1.39 | 5.6% | 2.78 |
| 100 | 40 | 1.30 | 4.6% | 2.28 |
| 150 | 40 | 1.12 | 3.1% | 1.66 |
| 40 | 60 | 2.43 | 16.8% | 4.65 |
| 60 | 60 | 2.25 | 12.7% | 3.38 |
| 80 | 60 | 2.09 | 10.1% | 2.65 |
| 100 | 60 | 1.95 | 8.2% | 2.20 |
| 150 | 60 | 1.68 | 5.4% | 1.62 |
| 60 | 80 | 2.99 | 18.8% | 3.14 |
| 80 | 80 | 2.79 | 14.9% | 2.51 |
| 100 | 80 | 2.60 | 12.1% | 2.10 |
| 150 | 80 | 2.24 | 7.9% | 1.57 |
| 60 | 100 | 3.74 | 23.5% | 2.96 |
| 80 | 100 | 3.48 | 19.1% | 2.38 |
| 100 | 100 | 3.25 | 15.7% | 2.02 |
| 150 | 100 | 2.80 | 10.3% | 1.53 |
| 80 | 125 | 4.35 | 20.4% | 2.34 |
| 100 | 125 | 4.07 | 18.0% | 1.96 |
| 150 | 125 | 3.50 | 12.4% | 1.50 |

As illustrated in Table 4 above, the viscosity of the liquid coolant decreased with increasing concentration of dissolved Argon. For example, the liquid coolant had a viscosity of 2.39 cSt at atmospheric pressure and 100° C. with no dissolved Argon but had a viscosity of 2.02 cSt at 100 bar and 100° C. with 3.25 g/L of dissolved Argon, indicating a viscosity reduction of 15.7%.

Example 4

This example was performed to further illustrate the dissolution of a gas into a base oil. The base oil used for this example was a severely hydrotreated napthenic base oil with a density of about 0.86 g/cm³ at 15° C., a KV100 of about 1.2 cSt, and a KV40 of about 2.8 cSt. The base oil also had a flash point of about 106° C., and a liquid solubility parameter of 15.6 MPa$^{0.5}$. The gas was carbon dioxide with a gas solubility parameter of 14.81 MPa$^{0.5}$.

The test system described in Example 1 was used for this example. Experimental measurements of liquid density, vapor pressure, and viscosity were recorded over a temperature range of −20° C. to 150° C. The experiment was repeated over this temperature range at pressures ranging from 0 bar to 100 bar. From these experimental measurements, the viscosity decrease and gas content of the liquid coolant were calculated. The viscosity decreased was calculate compared to the comparative sample at 0 bar with no gas dissolution. The results of this tests are provided in the table below:

TABLE 5

| Measured Temp. (° C.) | Measured Pressure (bar) | Modeled Gas Content (g/L) | Calculated Viscosity Decrease (%) | Measured, Interpolated Liquid Coolant Viscosity (cSt) |
|---|---|---|---|---|
| −20 | 0 | 0.00 | 0.0% | 18.6 |
| 0 | 0 | 0.00 | 0.0% | 8.8 |
| 20 | 0 | 0.00 | 0.0% | 5.2 |
| 40 | 0 | 0.00 | 0.0% | 3.6 |
| 60 | 0 | 0.00 | 0.0% | 2.7 |
| 80 | 0 | 0.00 | 0.0% | 2.2 |
| 100 | 0 | 0.00 | 0.0% | 1.9 |
| 150 | 0 | 0.00 | 0.0% | 1.5 |
| 0 | 20 | 9.61 | 58.1% | 3.7 |
| 20 | 20 | 7.47 | 39.2% | 3.1 |
| 40 | 20 | 5.97 | 27.1% | 2.6 |
| 60 | 20 | 4.89 | 19.3% | 2.2 |
| 80 | 20 | 4.08 | 14.1% | 1.9 |
| 100 | 20 | 3.46 | 10.6% | 1.7 |
| 150 | 20 | 2.42 | 5.6% | 1.4 |
| 20 | 40 | 14.94 | 60.4% | 2.1 |
| 40 | 40 | 11.95 | 44.0% | 2.0 |
| 60 | 40 | 9.77 | 32.3% | 1.8 |
| 80 | 40 | 8.15 | 24.0% | 1.7 |
| 100 | 40 | 6.91 | 18.2% | 1.5 |
| 150 | 40 | 4.85 | 9.8% | 1.3 |
| 40 | 60 | 17.92 | 54.5% | 1.6 |
| 60 | 60 | 14.66 | 41.3% | 1.6 |
| 80 | 60 | 12.23 | 31.4% | 1.5 |
| 100 | 60 | 10.37 | 24.2% | 1.4 |
| 150 | 60 | 7.27 | 13.3% | 1.3 |
| 60 | 80 | 19.54 | 47.4% | 1.4 |
| 80 | 80 | 16.30 | 36.8% | 1.4 |
| 100 | 80 | 13.82 | 28.8% | 1.3 |
| 150 | 80 | 9.69 | 16.2% | 1.2 |
| 80 | 100 | 20.38 | 40.8% | 1.3 |
| 100 | 100 | 17.28 | 32.3% | 1.3 |
| 150 | 100 | 12.11 | 18.6% | 1.2 |

As illustrated in Table 5 above, the viscosity of the liquid coolant decreased with increasing concentration of dissolved carbon dioxide. For example, the liquid coolant had a viscosity of 1.9 cSt at atmospheric pressure and 100° C. with no dissolved carbon dioxide but had a viscosity of 1.3 cSt at 100 bar and 100° C. with 17.28 g/L of dissolved carbon dioxide, indicating a viscosity reduction of 32.3%.

Example 5

This example was performed to further illustrate the dissolution of a gas into a base oil. The base oil used for this example was a severely hydrotreated napthenic base oil with a density of about 0.86 g/cm³ at 15° C., a KV100 of about 1.2 cSt, and a KV40 of about 2.8 cSt. The base oil also had a flash point of about 106° C., and a solubility parameter of 15.6 MPa$^{0.5}$. The gas was Argon with a gas solubility parameter of 7.77 MPa$^{0.5}$.

The test system described in Example 1 was used for this example. Experimental measurements of liquid density, vapor pressure, and viscosity were recorded over a temperature range of −20° C. to 150° C. The experiment was repeated over this temperature range at pressures ranging from 0 bar to 125 bar. From these experimental measurements, the viscosity decrease and gas content of the liquid coolant were calculated. The viscosity decreased was calculate compared to the comparative sample at 0 bar with no gas dissolution. The results of this tests are provided in the table below:

TABLE 6

| Measured Temp. (° C.) | Measured Pressure (bar) | Modeled Gas Content (g/L) | Calculated Viscosity Decrease (%) | Measured, Interpolated Liquid Coolant Viscosity (cSt) |
|---|---|---|---|---|
| −20 | 0 | 0.00 | 0.0% | 18.9 |
| 0 | 0 | 0.00 | 0.0% | 8.9 |
| 20 | 0 | 0.00 | 0.0% | 5.2 |
| 40 | 0 | 0.00 | 0.0% | 3.6 |
| 60 | 0 | 0.00 | 0.0% | 2.7 |
| 80 | 0 | 0.00 | 0.0% | 2.2 |
| 100 | 0 | 0.00 | 0.0% | 1.9 |
| 150 | 0 | 0.00 | 0.0% | 1.5 |
| 0 | 20 | 0.93 | 11.4% | 7.8 |
| 20 | 20 | 0.86 | 8.1% | 4.8 |
| 40 | 20 | 0.79 | 5.9% | 3.4 |
| 60 | 20 | 0.73 | 4.3% | 2.61 |
| 80 | 20 | 0.69 | 3.3% | 2.15 |
| 100 | 20 | 0.64 | 2.5% | 1.86 |
| 150 | 20 | 0.55 | 1.4% | 1.46 |
| 20 | 40 | 1.71 | 14.2% | 4.49 |
| 40 | 40 | 1.58 | 10.5% | 3.21 |
| 60 | 40 | 1.47 | 7.9% | 2.51 |
| 80 | 40 | 1.37 | 6.1% | 2.09 |
| 100 | 40 | 1.28 | 4.7% | 1.81 |
| 150 | 40 | 1.11 | 2.6% | 1.44 |
| 40 | 60 | 2.37 | 14.2% | 3.08 |
| 60 | 60 | 2.20 | 10.9% | 2.43 |
| 80 | 60 | 2.06 | 8.4% | 2.04 |
| 100 | 60 | 1.93 | 6.6% | 1.78 |
| 150 | 60 | 1.66 | 3.8% | 1.43 |
| 60 | 80 | 2.94 | 13.3% | 2.37 |
| 80 | 80 | 2.74 | 10.4% | 1.99 |
| 100 | 80 | 2.57 | 8.3% | 1.75 |
| 150 | 80 | 2.22 | 4.9% | 1.41 |
| 60 | 100 | 3.67 | 15.2% | 2.31 |
| 80 | 100 | 3.43 | 12.1% | 1.95 |
| 100 | 100 | 3.21 | 9.8% | 1.72 |
| 150 | 100 | 2.77 | 6.0% | 1.39 |
| 80 | 125 | 4.28 | 13.8% | 1.92 |
| 100 | 125 | 4.01 | 11.3% | 1.69 |
| 150 | 125 | 3.47 | 7.1% | 1.38 |

As illustrated in Table 6 above, the viscosity of the liquid coolant decreased with increasing concentration of dissolved Argon. For example, the liquid coolant had a viscosity of 1.9 cSt at atmospheric pressure and 100° C. with no dissolved Argon but had a viscosity of 1.72 cSt at 100 bar and 100° C. with 3.21 g/L of dissolved Argon, indicating a viscosity reduction of 9.8%.

While the disclosure has been described with respect to a number of embodiments and examples, those skilled in the art, having benefit of this disclosure, will appreciate that other embodiments can be devised which do not depart from the scope and spirit of the invention as disclosed herein. Although individual embodiments are discussed, the invention covers all combinations of all those embodiments.

Where a range of values is provided, it is understood that each intervening value, to the tenth of the unit of the lower limit unless the context clearly dictates otherwise (such as in the case of a group containing a number of carbon atoms in which case each carbon atom number falling within the range is provided), between the upper and lower limit of that range and any other stated or intervening value in that stated range is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either both of those included limits are also included in the disclosure.

It should also be understood that, unless clearly indicated to the contrary, in any methods claimed herein that include more than one step or act, the order of the steps or acts of the method is not necessarily limited to the order in which the steps or acts of the method are recited.

The following terms are used to describe the present disclosure. In instances where a term is not specifically defined herein, that term is given an art-recognized meaning by those of ordinary skill applying that term in context to its use in describing the present disclosure.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of," or "exactly one of."

The term "about" or "approximately" means an acceptable experimental error for a particular value as determined by one of ordinary skill in the art, which depends in part on how the value is measured or determined. All numerical values within the specification and the claims herein are modified by "about" or "approximately" the indicated value, and take into account experimental error and variations that would be expected by a person having ordinary skill in the art.

The phrase "major amount" or "major component" as it relates to components included within the liquid coolants of the specification and the claims means greater than or equal to 50 wt. %, or greater than or equal to 60 wt. %, or greater than or equal to 70 wt. %, or greater than or equal to 80 wt. %, or greater than or equal to 90 wt. % based on the total weight of the liquid coolant. The phrase "minor amount" or "minor component" as it relates to components included within the liquid coolants of the specification and the claims means less than 50 wt. %, or less than or equal to 40 wt. %, or less than or equal to 30 wt. %, or greater than or equal to 20 wt. %, or less than or equal to 10 wt. %, or less than or equal to 5 wt. %, or less than or equal to 2 wt. %, or less than or equal to 1 wt. %, based on the total weight of the liquid coolant. The phrase "substantially free" or "essentially free" as it relates to components included within the liquid coolants of the specification and the claims means that the particular component is at 0 weight % within the lubricating oil, or alternatively is at impurity type levels within the lubricating oil (less than 100 ppm, or less than 20 ppm, or less than 10 ppm, or less than 1 ppm).

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

What is claimed is:

1. A liquid coolant for electric systems, comprising:
   a base oil, wherein the base oil is a major component of the liquid coolant; and
   one or more dissolved gases, wherein all of the dissolved gases in the liquid coolant consist of the one or more dissolved gases;
      wherein the total amount of all of the dissolved gases in the liquid coolant is sufficient to reduce the kinematic viscosity at 100° C. of the liquid coolant by at least 2%, as compared to the base oil in the absence of all of the dissolved gases;
      wherein the liquid coolant has a kinematic viscosity at 100° C. of about 7 cSt or less; and
      wherein the total amount of all of the dissolved gases in the liquid coolant is about 0.2 grams per Liter (g/L) of the liquid coolant to about 5 g/L of the liquid coolant.

2. The liquid coolant of claim 1, wherein the base oil comprises at least one base stock selected from the group consisting of Group I base stock, Group II base stock, Group III base stock, Group IV base stock, Group V base stock, and combinations thereof.

3. The liquid coolant of claim 1, wherein the base oil comprises a polyalphaolefin base stock.

4. The liquid coolant of claim 1, wherein the base oil comprises at least one Group V base stock selected from the group consisting of hydrocarbyl aromatics, alkylated aromatics, monoesters, polyesters, silicate esters, polyalkylene glycols, polytetrahydrofurans, and ionic liquids, and combinations thereof.

5. The liquid coolant of claim 1, wherein the one or more dissolved gases comprise carbon dioxide, argon, a hydrocarbon, or any combination thereof.

6. The liquid coolant of claim 1, wherein the the kinematic viscosity at 100° C. of the liquid coolant is reduced up to about 25%, as compared to the base oil in the absence of the one or more dissolved gases.

7. The liquid coolant of claim 1, wherein the one or more dissolved gases consist of a noble gas.

8. The liquid coolant of claim 7, wherein the noble gas comprises argon.

9. The liquid coolant of claim 1, wherein the kinematic viscosity at 100° C. of the liquid coolant is about 1 cSt to about 4 cSt, wherein a heat capacity of the liquid coolant is about 2.0 KJ/kg K or greater, wherein a density of the liquid coolant is about 0.92 g/mL or greater.

10. The liquid coolant of claim 9, wherein the base oil comprises a naphthenic base stock, and wherein the one or more dissolved gases comprise carbon dioxide, argon, a hydrocarbon, or any combination thereof.

11. The liquid coolant of claim 9, wherein the base oil comprises a polyalphaolefin base stock, and wherein the one or more dissolved gases comprise carbon dioxide, argon, a hydrocarbon, or any combination thereof.

12. A method of producing a liquid coolant, the method comprising:
introducing a base oil into a container; and
pressuring the container with one or more gases such that a volume of the one or more gases dissolves into the base oil to provide the liquid coolant, wherein the liquid coolant comprises the base oil and the one or more dissolved gases, wherein the base oil is a major component of the liquid coolant, and wherein all of the dissolved gases in the liquid coolant consist of the one or more dissolved gases;
wherein the total amount of all of the dissolved gases in the liquid coolant is sufficient to reduce the kinematic viscosity at 100° C. of the liquid coolant by at least 2%, as compared to the base oil in the absence of all of the dissolved gases;
wherein the liquid coolant has a kinematic viscosity at 100° C. of about 7 cSt or less; and
wherein the total amount of all of the dissolved gases in the liquid coolant is about 0.2 grams per Liter (g/L) of the liquid coolant to about 5 g/L of the liquid coolant.

13. The method of claim 12, wherein the one or more gases consist of a noble gas.

14. The method of claim 12, wherein the one or more gases comprise carbon dioxide, argon, a hydrocarbon, or any combination thereof.

15. The method of claim 13, wherein the noble gas comprises argon.

16. The method of claim 12, further comprising (1) monitoring a viscosity of the base oil in the container with a viscometer; (2) monitoring a temperature of the base oil in the container; or both (1) and (2).

17. The method of claim 16, further comprising adjusting a pressure in the container in response to the viscosity.

18. The method of claim 12, further comprising storing the liquid coolant for about 1 day or more in the same container or in a different container, wherein the same container or the different container is a sealed container with an atmosphere of the one or more gases in the sealed container.

19. A method of cooling an electric system, comprising:
circulating a liquid coolant into a contact with one or more components of the electric system, thereby cooling the one or more components, wherein the liquid coolant comprises:
a base oil, wherein the base oil is a major component of the liquid coolant; and
one or more dissolved gases, wherein all of the dissolved gases in the liquid coolant consist of the one or more dissolved gases;
wherein the total amount of all of the dissolved gases in the liquid coolant is sufficient to reduce the kinematic viscosity at 100° C. of the liquid coolant by at least 2%, as compared to the base oil in the absence of all of the dissolved gases;
wherein the liquid coolant has a kinematic viscosity at 100° C. of about 7 cSt or less; and
wherein the total amount of all of the dissolved gases in the liquid coolant is about 0.2 grams per Liter (g/L) of the liquid coolant to about 5 g/L of the liquid coolant.

20. The method of claim 19, wherein the circulating comprises circulating the liquid coolant through an electric motor.

21. The method of claim 19, wherein the one or more dissolved gases consist of a noble gas.

22. The method of claim 21, wherein the noble gas comprises argon.

23. The method of claim 19, wherein the one or more dissolved gases comprise an inert gas, a noble gas, a hydrocarbon, or any combination thereof.

* * * * *